May 6, 1969
W. J. BLAZEK
3,442,164
BRAKE DISC LATHE
Filed Oct. 19, 1966
Sheet 2 of 4
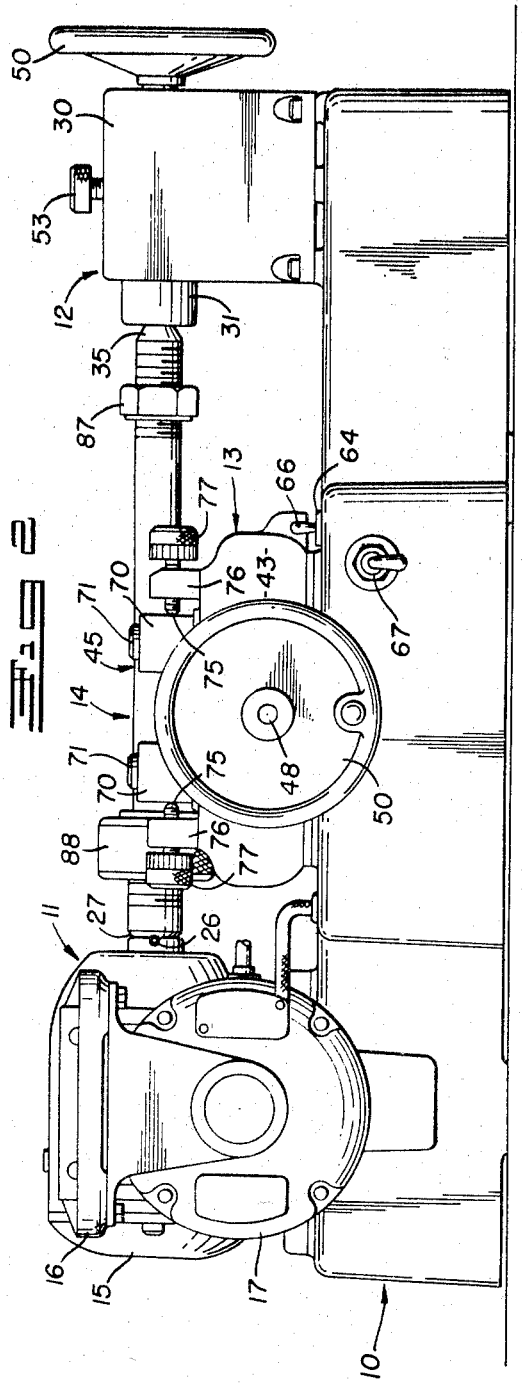
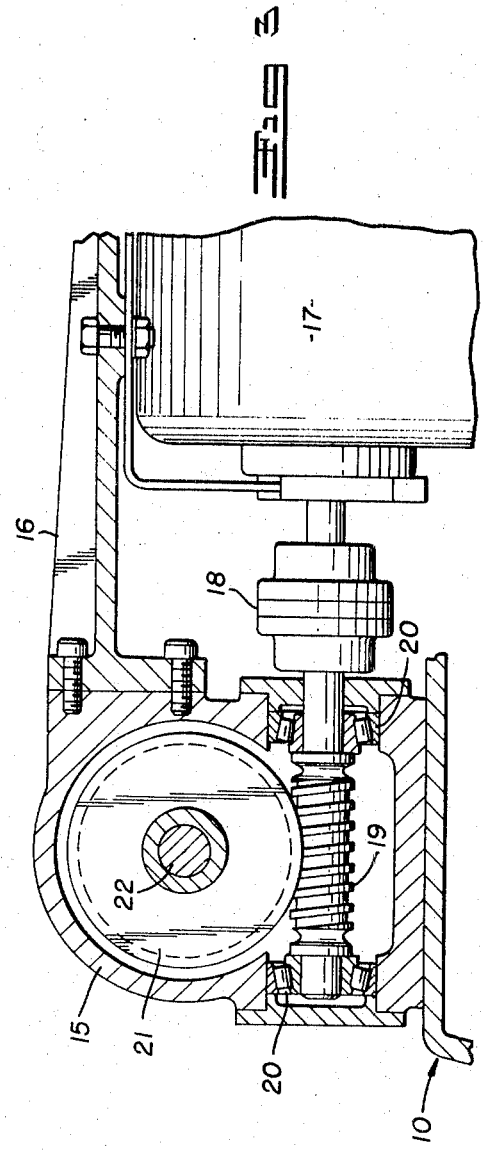
INVENTOR.
WILLIAM J. BLAZEK
BY
MAHONEY, MILLER & RAMBO
BY
ATTORNEYS

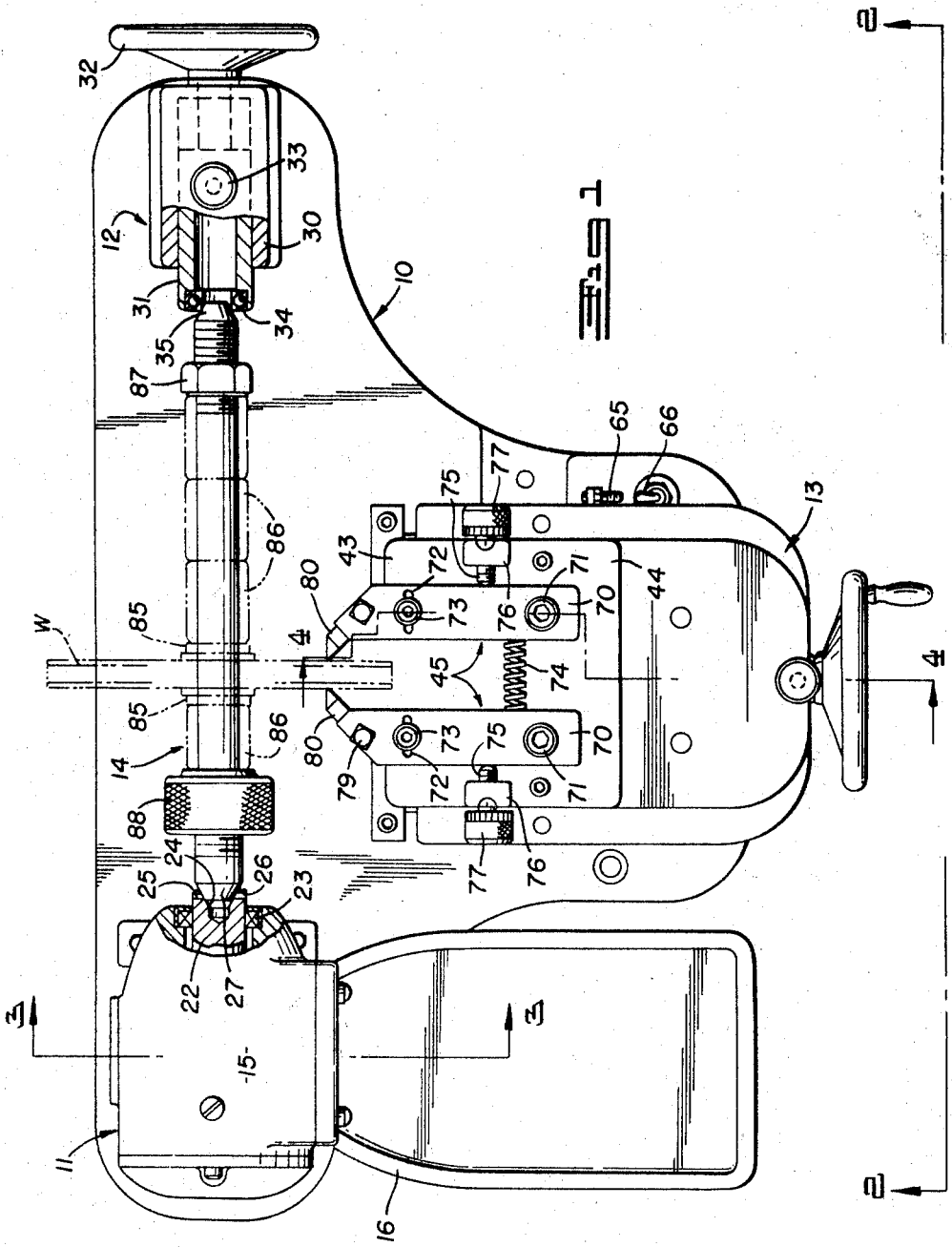

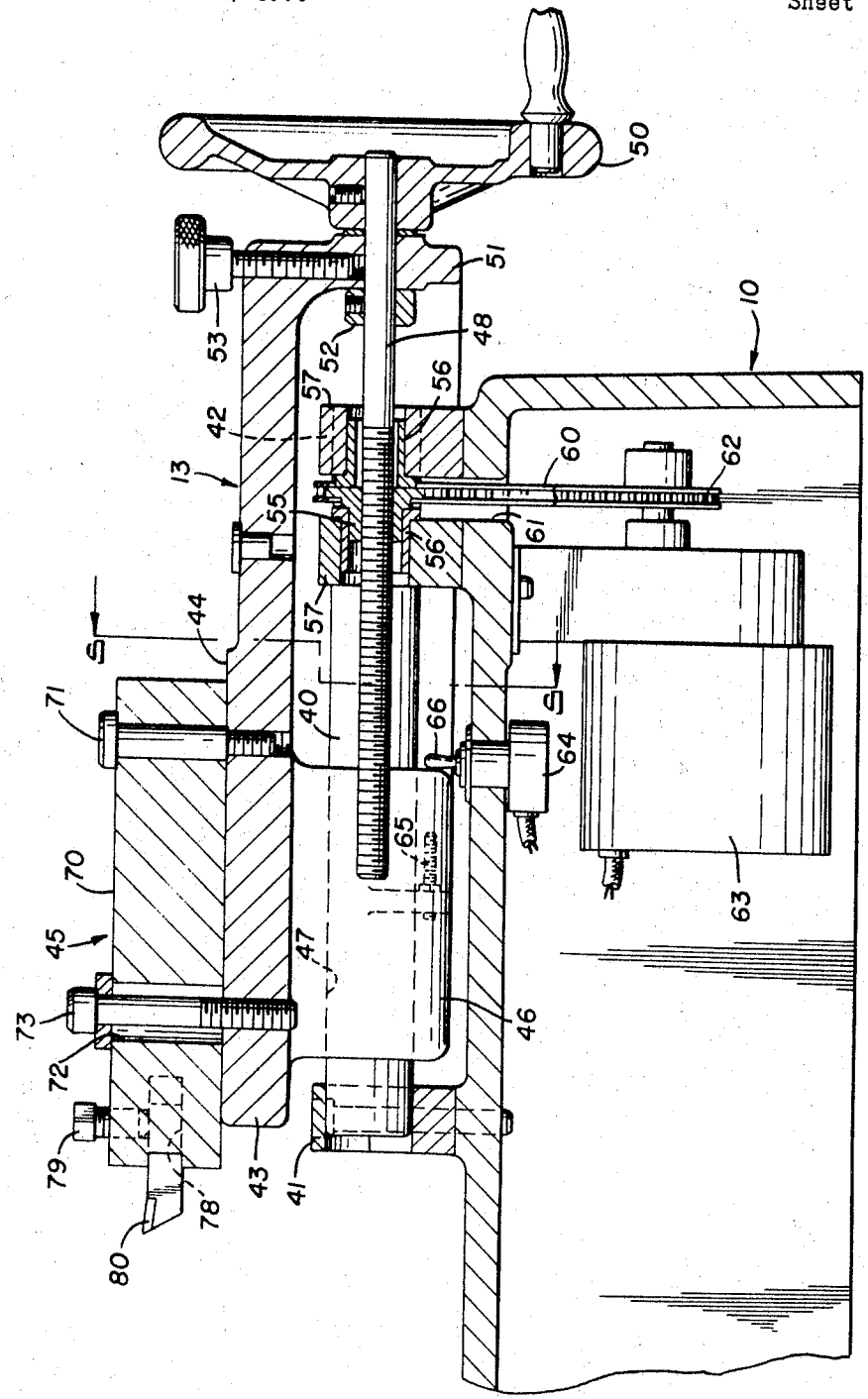

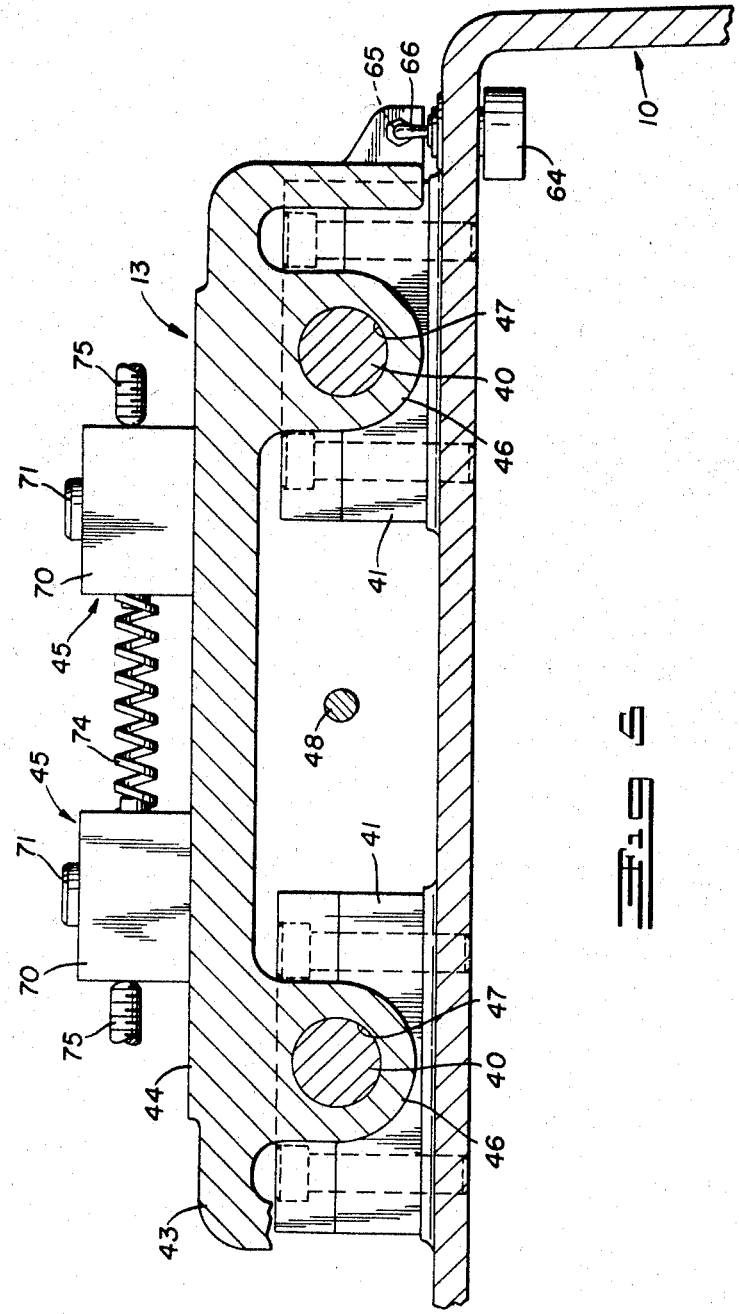

` # United States Patent Office

3,442,164
Patented May 6, 1969

3,442,164
BRAKE DISC LATHE
William J. Blazek, New Lexington, Ohio, assignor, by mesne assignments, to Bear Manufacturing Company, Rock Island, Ill., a corporation of Delaware
Filed Oct. 19, 1966, Ser. No. 587,766
Int. Cl. B23b 5/02, 21/00
U.S. Cl. 82—2    5 Claims

ABSTRACT OF THE DISCLOSURE

Brake disc lathe having a rotary headstock, a tailstock, an arbor shaft rotatably supported on the headstock and tailstock coaxially therewith and rotated by the headstock, means on the arbor shaft for supporting a brake disc with its faces perpendicular to the axis of rotation of the shaft, a slide movable on an axis perpendicular to said axis of rotation, slide supporting means concentric with the axis of slide movement for centered support thereof on said axis, and a pair of cutting tools on the slide engageable with the opposite faces of a brake disc for simultaneously facing both of its said faces, said tools being spaced equal distances to opposite sides of the axis of movement of the slide for fully balanced and accurate facing of the disc.

---

This inventon relates to a disc lathe. It has to do, more particularly, with a machine tool in the form of a disc lathe of a novel type which is particularly suitable for refinishing or remachining various types of discs commonly used in disc brake units on automobiles or other vehicles.

In refinishing discs of this type, it is important that both sides of the discs be machined simultaneously to ensure that the resulting refinished opposed faces are in exact parallelism. The machine of the present invention provides means for accurately positioning the disc in a fixed plane of rotation with the cutting tools in engagement with the opposite faces thereof for simultaneously finishing both faces as contrasted to finishing one face at a time which makes it difficult to obtain parallel faces. Also, in refinishing discs of this type, it is necessary to have a machine which will be capable of receiving and mounting various types of discs and this is accomplished in the machine of the present invention by an arbor assembly having various adaptors and spacers so that various discs may be mounted thereon in a preselected axial position. The arbor assembly and the machine are designed to permit ease of mounting and removal of the entire work-carrying arbor assembly. The machine of the present invention also provides a cross feed slide arrangement which holds the cutting tools in proper accurate positions relative to the disc-carrying arbor assembly mounted on the machine. This slide is provided with manual feed means which facilitates initial positioning of the tools relative to the work and automatic feed means for feeding the cutting tools across the opposed faces of the work and interrupting the feed automatically when the refinishing operation is completed.

In the accompanying drawings there is illustrated a preferred form of machine tool embodying this invention but it is to be understood that specific details thereof may be varied without departing from basic principles of the invention.

In these drawings:

FIGURE 1 is a plan view of the machine.

FIGURE 2 is a front elevational view of the machine taken from the position indicated at line 2—2 of FIGURE 1.

FIGURE 3 is an enlarged vertical sectional view taken along line 3—3 of FIGURE 1 showing the worm and gear drive for the work-mounting arbor.

FIGURE 4 is an enlarged vertical sectional view taken along line 4—4 of FIGURE 1 showing the tool-carriage feed mechanism of the cross-slide assembly.

FIGURE 5 is a vertical sectional view taken along line 5—5 of FIGURE 4.

Referring to the drawings more in detail, the general structure of the machine will be apparent best from FIGURES 1 and 2. The machine comprises a base 10 which is of suitable substantially triangular form as indicated to support the various assemblies of the machine which comprise generally a headstock assembly 11, a tailstock assembly 12, and a tool-carrying cross feed assembly 13. Between the axially aligned tailstock and headstock assemblies, a work-holding arbor assembly 14 is removably mounted.

The headstock assembly 11 comprises a main gear-housing casting 15 which rests on and is suitably secured to the upper surface of the base 10 adjacent its rear and left-hand corner, as indicated in FIGURE 1. Secured to the housing 15 is a combination support bracket and tray 16 which extends forwardly thereof and which has suitably suspended from the lower side thereof, the electric-drive motor 17. The drive shaft of this motor 17 is coupled by a coupling 18 (FIGURE 3) to a worm 19 which is rotatably mounted in antifriction bearings 20 carried in the lower portion of the housing 15 coaxial with the drive shaft of the motor. The worm 19 engages with a worm gear 21 which is keyed on a spindle 22 that is rotatably mounted in the housing 15 by the antifriction bearings 23. The spindle 22 projects inwardly from the housing 15 and is provided with an open tapered female socket 24 having outwardly opening, diametrically opposed, pin-receiving notches or slots 25 which will engage with a diametrically-extending pin 26 carried on the tapered male end 27 of the arbor 14 when such end is mated with the socket. Thus, the spindle 22 will be driven positively upon actuation of the motor 17.

The tailstock assembly 12 comprises a main housing casting 30 which is suitably fixed to the upper surface of the base 10 at the rear right-hand corner thereof. This tailstock has the usual quill 31 adjustable axially in a suitable socket in the housing by means of the usual handwheel and screw arrangement 32. The quill is prevented from rotating and is fixed axially in the usual manner by a lock screw 33. The inner end of the quill projects from the casting and is provided with an open socket having a sealed antifriction automotive type bearing 34 with an exposed inner race adapted to receive the adjacent tapered male end of the arbor 14. Thus, the bearing 34 will provide an idler support for the one tapered end 35 of the arbor and the coaxially aligned socket 24 in the spindle 22 will provide a driving support for the other tapered end 27 of the arbor which carries the pin 26.

The cross feed slide assembly 13 is mounted permanently on the base 10 of the machine in a fixed position but with the slide thereof movable forwardly and rearwardly at a right angle to the axes of the headstock 11 and the tailstock 12 and the arbor 14 when carried thereby. Thus, the slide will move a cutting tool carried thereby parallel to the face of a disc W carried by the arbor as will later appear more clearly. The details of this assembly are illustrated best in FIGURES 4 and 5. The cross feed slide is carried by the cylindrical ways or guides 40 which are disposed in a pair in parallel relationship and extending forwardly and rearwardly of the base 10. They are disposed at a level spaced above the upper surface of the base by means of suitable supports mounted on the base and which include the pillow blocks 41 which receive and clamp the rear ends thereof and pillow blocks 42 which receive and clamp the forward ends thereof. The cross slide 43 is in the form of a casting which has a flat raised plane surface 44 toward the rear thereof adapted to support the cutting or machining tools 45. The slide also has a pair of laterally spaced, parallel depending guide projections 46, each of which has a cylindrical bore 47 formed therein. The bores 47 are properly sized and spaced to slidably receive the cylindrical ways 40. The projections 46 are adapted to slide back and forth on the ways 40 between the pillow blocks 41 and 42.

The means for moving the slide 43 forwardly and rearwardly on the ways 40 comprises a screw and nut arrangement for driving the slide. This arrangement includes the feed screw 48 that has a handwheel 50 keyed on its outer end. The outer unthreaded portion of this screw extends rearwardly through a depending skirt 51 of the cross slide casting and is rotatable therein and a stop collar 52 is fixed on the screw just inwardly of the skirt 51 and this collar together with the handwheel 50 prevents axial movement of the screw in the skirt 51 but permits rotative movement therein. To selectively stop rotation of the screw in the skirt 51, a setscrew 53 is mounted in a tapped vertical bore in the skirt 51 so that its lower end can engage the feed screw. Thus, the feed screw can be releasably locked to prevent rotation in the skirt.

The screw 38 extends rearwardly between the ways 40 and the depending projections 46 of the slide 43. It is threaded the greater portion of its length to its rear extremity and passes rearwardly through the threaded opening in a sprocket nut 55. This nut is rotatably mounted and retained against axial movement by means of two shouldered bushings 56 which are carried by the axially spaced pillow blocks 57 which are upstanding from the base 10 adjacent the forward end thereof and are suitably fixed thereto. The sprocket nut 55 normally is driven constantly by a chain 60 which passes downwardly through a slot 61 into the interior of the base 10 and around a sprocket 62 driven by an electric gear motor 63 disposed within the base and suitably supported therein.

The motor 63 is controlled by a switch 64 mounted in the top of the base along the path of movement of the slide member 43 at one side thereof (FIGURES 4 and 5). The skirt of the slide 43 carries at this side a forwardly projecting screw 65, which is threaded through a lug for forward and rearward adjustment, which is designed to contact with the upstanding toggle lever 66 of the switch upon sufficient forward movement of the slide. This toggle lever 66 can also be actuated manually. A manual switch 67 (FIGURE 2) is provided at the forward side of the base 10 for controlling the drive motor 17.

The slide member 43 is adapted to carry the machining or cutting tools and for this purpose a pair of tool-holding blocks 70 are mounted in laterally spaced relationship on the plane surface 44 thereof. Each block 70 is pivoted at its rear end by a bolt 71 to the member 43. Adjacent its forward end each block 70 is provided with a transverse slot 72 and a hold-down lock screw 73 passes downwardly through this slot and is threaded into the surface 44. A compression spring 74 is disposed between the blocks 70 (FIGURE 1) just inwardly or rearwardly of the pivots 71 and serves to swing the rear or inner ends of the blocks 70 apart for lateral adjustment in the direction of the axis of the arbor 14. This outward swinging movement away from each other is limited by the opposed abutments in the form of adjustable micrometer screws 75 threaded through lugs 76 upstanding from the slide member 43 and adjusted by means of the knobs 77. The rearward or inner end of each block 70 is provided with a rearwardly opening, tool-receiving socket 78 (FIGURE 4) in which a cutting tool tip 80 is removably mounted and is normally held therein by means of a setscrew 79. Thus, the spring 74 urges the respective cutting tools 80 in one direction against the respective abutments 75 which are adjustable to control the position of said tools laterally and in the direction of the arbor axis.

The work-holding arbor assembly 14 is designed to receive and support the work W which will be any of the various types of discs now commonly used in break units. Some of these will have integral hubs and others will not and a set of hub adaptors 85 may be provided for disposition on the arbor at opposite sides of the disc for engaging the disc so that it will be rotated with the driven arbor. Also, a set of spacer sleeves 86 will be provided for slidably mounting on the arbor at opposite sides of the disc in a suitable arrangement to roughly locate the disc axially on the arbor for cooperation with the cutting tools 80. The opposed ends of the arbor are threaded and the one threaded end carries an adjustable work-lock nut 87 whereas the other end carries a knurled work-position nut 88. Proper adjustment of these nuts, which are located at opposite sides of the disc W, axially of the arbor will move the work and work locators axially of the arbor and laterally of the cross slide member 43 to accurately position the work disc in a vertical plane located substantially in the vertical center plane of the cross slide, that is, centered between the opposed tool blocks 70.

In the use of this machine, the disc W is mounted on the arbor in the indicated manner to provide the arbor assembly 14 with the work W properly spaced axially thereof. The arbor assembly is then mounted on the lathe. Assuming the lock screw 33 of the tailstock has been disengaged, the end 27 of the arbor is inserted in the headstock socket 24 in driving engagement with the spindle 22 and the opposite end 35 is aligned with the socket bearing 34 of the quill 31 which is adjusted into engagement therewith by the handwheel 32 and then the screw 33 is locked against the quill. The cross slide feed is disengaged by turning the lock screw 53, and the cross slide 13 is retracted by turning the wheel 50 to cause screw 48 to feed outwardy through the sprocket nut 55. This is done prior to mounting the work-carrying arbor 14 on the lathe so as to facilitate loading of the work and to prevent damage to the tool bits 80. The tool lock screws 73 are loosened and by operating the micrometer screw knobs 77, the cutting tool bits 80 are backed off sufficiently to clear the opposed faces of the disc. Then the cross slide 43 is run in manually by turning the handwheel 50 and causing screw 48 to feed inwardly through the nut 55 until the bits are in the desired inner position radially of the disc W to begin the cut. The cutting tools will straddle the disc so that both sides thereof will be finished simultaneously which is essential in this type of work to obtain precisely parallel finished faces as contracted to refinishing one face at a time. The tool bits 80 are then brought into contact with the disc faces by adjustment of the knobs 77 and the lock screws 73 are then tightened. The automatic cross slide feed then is engaged by turning the lock screw 53 to engage the feed screw 48. The headstock drive motor 17 is then started by switching on the switch 67. The cross slide motor 63 is also started by switching on the switch lever 66 and it will be noted that at this time, the toggle 66 (FIGURE 1) will be spaced outwardly or forwardly of the contact screw 65 carried by the slide member 43. This will drive the sprocket nut 55 which will feed the screw 48 axially outwardly or forwardly and, therefore, move the slide member 43 correspondingly, causing the cutting tool bits 80 to radially traverse the opposed faces of the rotating disc W, to properly refinish the disc. Feed of the slide member 43 will continue until the switch toggle 66 is contacted by the screw 65 and is moved to its off position when the movement will be automatically stopped and the work-carrying arbor assembly 14 can then be removed so that the finished disc W can then be removed from the arbor.

It will be apparent from the above description that the machine of the present invention provides means for quickly mounting or removing the work in the form of various types of discs, means for accurately holding the work and driving it and for finishing the opposed surfaces accurately in precise parallelism, and manual means for initially positioning the work and cutting tools relatively and automatically traversing the tools over the work faces and then automatically stopping the traversing operation.

Having thus described this invention, what is claimed is:

1. A lathe-type machine for facing the opposite side faces of a brake disc comprising a base; a rotary headstock mounted on said base; a rotary tailstock mounted on said base in spaced relation to said headstock, said headstock and tailstock having a common axis of rotation; disc-supporting means drivingly connected with said headstock and with said tailstock for supporting and rotating a brake disc coaxially with and with the side faces thereof disposed in planes perpendicular to the axis of rotation of said headstock and tailstock; a slide carried on said base for movement in a direction perpendicular to the axis of rotation of said headstock and tailstock and parallel to the planes of the side faces of a brake disc supported on said disc-supporting means; means on said base concentric with the axis of movement of said slide for supporting said slide centrally on said axis, and a pair of cutting tool means carried by and movable with said slide and engageable simultaneously with the opposite side faces of a brake disc supported on said disc-supporting means for simultaneously facing the opposite side faces thereof, said cutting tool means being mounted equal distances to opposite sides of the axis of movement of said slide.

2. A machine as defined in claim 1, wherein said disc-supporting means comprises an elongated arbor having opposite end portions detachably connected with said headstock and said tailstock respectively, an intermediate section arranged to drivingly support a brake disc with the opposite side faces thereof disposed in planes truly perpendicular to the axis of rotation of said headstock and tailstock, a disc-positioning member adjustably mounted on one end of said arbor to vary the longitudinal position of a disc supported on said arbor, and a disc-locking member adjustably mounted on the other end of said arbor for locking the disc thereon in adjusted position.

3. A machine as defined in claim 1, wherein said disc supporting means comprises an arbor shaft, said headstock includes a drive spindle for detachably and drivingly engaging one end of said arbor shaft, and said tailstock includes an antifriction bearing having an inner, rotatable race defining a socket for receiving and rotatably supporting the opposite end of said arbor shaft.

4. A machine as defined in claim 1, wherein said cuting tool means comprise a pair of relatively laterally spaced apart, tool-holding blocks pivotally secured to said slide to opposite sides of the axis of movement of said slide, a spring normally biasing said blocks apart, and a pair of manually operable adjustable abutments engaging respective ones of said blocks for adjusting the relative spacing thereof in opposition to said spring means.

5. A lathe-type machine for facing the opposite side faces of a brake disc comprising a base; a rotary headstock mounted on said base; a rotary tailstock mounted on said base in spaced relation to said headstock, said headstock and tailstock having a common axis of rotation; disc-supporting means drivingly connected with said headstock and with said tailstock for supporting and rotating a brake disc with the side faces thereof disposed in planes perpendicular to the axis of rotation of said headstock and tailstock; a slide carried on said base for movement in a direction perpendicular to the axis of rotation of said headstock and tailstock and parallel to the planes of the side faces of a brake disc supported on said disc-supporting means; cutting tool means carried by and movable with said slide and engageable simultaneously with the opposite side faces of a brake disc supported on said disc-supporting means for simultaneously facing the opposite side faces thereof, and motor driven means connected with said slide for moving the same in a direction perpendicular to the axis of rotation of said headstock and tailstock, said motor driven means comprising a threaded gear rotatably supported on said base, a feed screw carried by said slide and threadedly engaged with said gear, and manually operable means carried by said slide and operable selectively to permit said screw to rotate in unison with said gear, or to lock said screw against rotation with said gear.

References Cited

UNITED STATES PATENTS

| 185,159 | 12/1876 | Bartlett | 29—97 X |
| 1,383,981 | 7/1921 | Catlin | 82—36 |
| 2,542,616 | 2/1951 | Barrett | 82—4.1 |
| 3,245,292 | 4/1966 | Kushmuk | 82—24 |

FOREIGN PATENTS 1,378,424  10/1964  France.

LEONIDAS VLACHOS, *Primary Examiner.*

U.S. Cl. X.R.

82—24